United States Patent
Schnitzlein et al.

(10) Patent No.: US 7,012,241 B2
(45) Date of Patent: Mar. 14, 2006

(54) DEVICE AND METHOD FOR LINEAR ILLUMINATION OF AN OBJECT USING LEDS AND ELLIPTICAL MIRRORS

(75) Inventors: Markus Schnitzlein, Radolfzell (DE); Arnold Allweier, Allensbach (DE)

(73) Assignee: Océ Document Technologies GmbH, Poing (DE)

( * ) Notice: Subject to any disclaimer, the term of this patent is extended or adjusted under 35 U.S.C. 154(b) by 310 days.

(21) Appl. No.: 10/468,616

(22) PCT Filed: Feb. 20, 2002

(86) PCT No.: PCT/EP02/01797

§ 371 (c)(1),
(2), (4) Date: Aug. 20, 2003

(87) PCT Pub. No.: WO02/067567

PCT Pub. Date: Aug. 29, 2002

(65) Prior Publication Data

US 2004/0075047 A1  Apr. 22, 2004

(30) Foreign Application Priority Data

Feb. 20, 2001  (DE) ............................... 101 08 075

(51) Int. Cl.
*H01J 3/14* (2006.01)

(52) U.S. Cl. ................................. 250/216; 250/208.1
(58) Field of Classification Search ................. None
See application file for complete search history.

(56) References Cited

U.S. PATENT DOCUMENTS

| 4,287,414 A | | 9/1981 | Soo et al. |
| 4,422,100 A | | 12/1983 | DuVall et al. |
| 4,657,721 A | * | 4/1987 | Thomas ...................... 376/104 |
| 5,412,205 A | | 5/1995 | McVicar et al. |
| 5,828,050 A | | 10/1998 | Barkan |
| 6,133,565 A | | 10/2000 | Fujimoto et al. |

FOREIGN PATENT DOCUMENTS

| DE | OS 2 217 421 | 10/1973 |
| DE | 41 23 916 C2 | 1/1992 |
| DE | 195 32 877 A1 | 3/1997 |
| FR | 1 237 467 | 6/1960 |

OTHER PUBLICATIONS

Patent Abstract of Japan 08 307610A, Nov. 22, 1996, English Abstract.

(Continued)

*Primary Examiner*—Que T. Le
(74) *Attorney, Agent, or Firm*—Schiff Hardin LLP

(57) ABSTRACT

A device, method and system is provided for illuminating an object. A light source such as an LED and in particular a polychromatic LED is positioned at a first focal line of an elliptical mirror that has two focal lines. The mirror is shaped as a portion of an inner generated surface of an elliptical cylinder. The object to be illuminated is positioned at the second focal line of the mirror. A plurality of such mirrors may be provided positioned with a common second focal line. A cascade of mirrors may be positioned with a common second focal line at a first focal line of a concentrating mirror. The LEDs may be mounted on one or both sides of a circuit board.

31 Claims, 5 Drawing Sheets

OTHER PUBLICATIONS

Patent Abstract of Japan 2000 312 305 A, Nov. 7, 2000, English Abstract.

Patent Abstract of Japan 56 106 257 A m. Abstract, Aug. 24, 1981, English Abstract.

* cited by examiner

DEVICE AND METHOD FOR LINEAR ILLUMINATION OF AN OBJECT USING LEDS AND ELLIPTICAL MIRRORS

BACKGROUND OF THE INVENTION

1. Field of the Invention

The present invention relates generally to a device to linearly illuminate an object. Furthermore, the invention concerns a method to linearly illuminate an object and a scanning system.

2. Description of the Related Art

A typical use for a device to linearly illuminate an object is an image acquisition system, in which a sensor (for example a camera) detects graphical elements of a master, digitalizes these graphical elements, and processes the image data. The quality of an image acquisition system is directly dependent on the amount of light that is available to the sensor during the scanning to generate the corresponding signals. It is therefore desirable (in particular in the field of rapid line-scanning systems) to provide a large amount of light, since a higher signal-to-noise ratio is thereby supplied for the subsequent signal processing. Furthermore, it is necessary to employ a light source with as little power dissipation as possible that exhibits a high time stability and temperature stability.

Light-emitting diodes, what are known as LEDs, have very good characteristics for use in image acquisition system with regards to lifespan, time stability, temperature stability, and efficiency of the light yield. Known scanning systems that use LED lines focus the radiation with the aid of bar lenses or Fresnel lenses. Such systems are used for monochromatic light.

Due to newer developments, polychromatic LEDs are currently available that also emit white light. However, such LEDs have a smaller light-power density, such that they can only be employed in a very restricted manner in image acquisition systems. The use of lens components, for example of bar lenses or Fresnel lenses, in polychromatic light leads to significant chromatic image errors. These chromatic image errors manifest themselves in color errors on the focus edges. However, in the scanning of color graphic image elements it is necessary to have a homogenous color temperature for the entire field of illumination in order to prevent an incorrect scan. Therefore, it is only possible with great effort to focus light radiation of polychromatic LEDs with the aid of lens systems.

An optical scanning system is known from U.S. Pat. No. 5,828,050 that operates with a curved pivotable mirror. The radiation of a monochromatic LED is directed by the mirror as a light spot on to an object to be scanned. The received beam path of a light-receiving diode is directed via the same mirror, such that the graphical elements illuminated in the light spot are scanned in the pivoting movement of the mirror.

A scanning system with a mirror arranged in stationary fashion is specified in U.S. Pat. No. 5,412,205 that is elliptical in cross-section. An elongated fluorescent tube is arranged in the first focal line of the mirror, the document to be scanned in the second focal line. The radiation of the fluorescent tube is focused by the mirror linearly onto the document.

An image reading device is known from Japanese Patent Document JP 08-307610A that uses an LED as a light source. This LED has an elliptical mirror, whereby the LED is arranged in a focal point of the mirror and the other focal point of the mirror is arranged on the image to be read.

Furthermore, reference is made to the following prior art: Japanese Patent Document JP 2000-312 305 A, French Patent Document FR 1 237 467, German Patent Document DE-OA 2 217 421, U.S. Pat. No. 6,133,565, Japanese Patent Document JP 56-106 257 A with abstract, German Patent Document DE 195 32 877 A1, and German Patent Document DE 42 23 916 C2. The use of elliptical mirrors in connection with digital cameras and scanning devices is specified in these documents.

SUMMARY OF THE INVENTION

The present invention provides a device to linearly illuminate an object that has a compact assembly and has a large quantity of illumination light available.

According to the invention, a mirror arranged in stationary fashion is used to focus radiation. This mirror has two focal lines. A plurality of LEDs are arranged along one focal line. The radiation detected from the mirror is focused in the second focal line.

In particular, the device for the linear illumination of an object has at least one mirror arranged in a stationary fashion has a concave curved elongated cylindrical section and two focal lines, a plurality of LEDs are arranged along a focal line that emit radiation in the direction of the mirror, the emitted radiation is concentrated in the second focal line, the cylindrical section of the mirror has the form of the inner generated surface of an elliptical cylinder, a plurality of mirrors with respectively a first focal line and a second focal line are provided, for each mirror a plurality of LEDs are arranged along the first focal line that emit radiation in the direction of the respective mirror, and the radiation reflected from the plurality of mirrors is concentrated in a common second focal line.

According to further aspects of the invention, a method for linear illumination of an object is provided, wherein at least one mirror arranged in a stationary fashion has a concave curved elongated cylindrical section and two focal lines, a plurality of LEDs are arranged along a focal line that emit radiation in the direction of the mirror, and the emitted radiation is concentrated in the second focal line, the cylindrical section of the mirror has the form of the inner generated surface of an elliptical cylinder, a plurality of mirrors are used with a first focal line and a second focal line, for each mirror a plurality of LEDs are arranged along the first focal line that emit radiation in the direction of the respective mirror, and the radiation reflected from the plurality of mirrors is concentrated in a common second focal line.

Further provided a system included in a sensor system, for example a camera, to scan an object. In particular, the system for linear illumination of an object has at least one mirror arranged in a stationary fashion has a concave curved elongated cylindrical section and two focal lines, a plurality of LEDs are arranged along a focal line that emit radiation in the direction of the mirror, the emitted radiation is concentrated in the second focal line in which the object is arranged, a sensor detects the radiation radiated from the object, the cylindrical section of the mirror has the form of the inner generated surface of an elliptical cylinder, a plurality of mirrors with respectively a first focal line and a second focal line are provided, for each mirror a plurality of LEDs are arranged along the first focal line that emit radiation in the direction of the respective mirror, and the radiation reflected from the plurality of mirrors is concentrated in a common second focal line.

BRIEF DESCRIPTION OF THE DRAWINGS

Exemplary embodiments of the invention are explained in the following using the drawings.

DETAILED DESCRIPTION OF THE PREFERRED EMBODIMENTS

Due to the use of LEDs, the present device has a compact assembly as well as further advantageous characteristics with regards to lifespan of the light source, time stability, temperature stability, and light yield. Due to the use of a stationary mirror, the beam path remains clear, since the position of the two focal lines of the mirror are given high degrees of design freedom. Due to the use of the mirror, no wavelength-dependent chromatic errors arise, such that no color errors ensue at the focus edges given use of LEDs that emit white light. This is advantageous when the device to linearly illuminate an object is comprised in a scanning system in which colored image elements should be scanned by means of a linearly operating scanning system, for example in digital scanner systems or copier systems.

According to the invention, the cylindrical section of the mirror has the form of the inner generated surface of an elliptical cylinder. The elliptically-shaped mirror has the property to fully focus radiation that is emitted from the first focal point of the ellipse onto the second focal point. Due to the geometric reflection of the mirror surface, no chromatic errors occur. Therefore, such a mirror system is well appropriate for polychromatic light. Given use of an elliptical cylinder, a focal line arises instead of a focal point, whereby an optimal linear illumination of an object is enabled. This linear illumination is particularly advantageous when an object must be digitally scanned.

Figure 1:
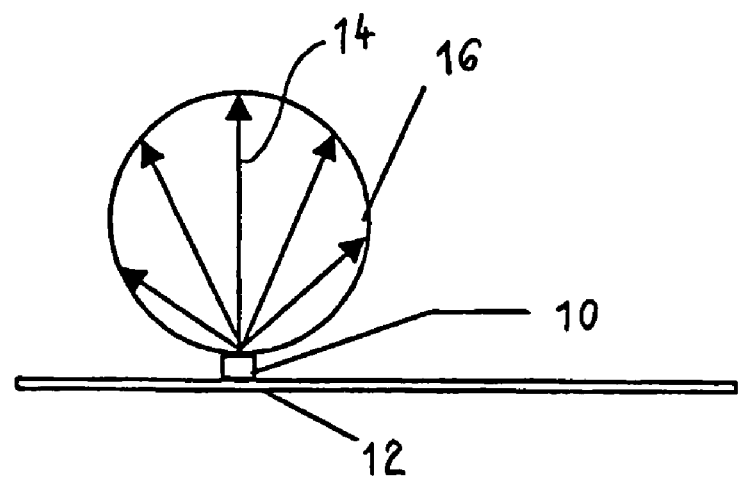
FIG. 1 is a schematic side view of an arrangement of an LED on a circuit board, and the radiation characteristic of the LED.

Referring to FIG. 1, an arrangement of an LED 10 on a circuit board 12 is shown. The circuit board 12 carries conductor paths and, if necessary, also electronic components to activate the LED 10. The LED 10 emits polychromatic light, in particular white light. The generation of polychromatic light is possible due to the use of fluorescing conversion materials in the semiconductor assembly of the LED. What is problematic is that the radiated power density is relatively small in such polychromatic LEDs 10. Given the use of polychromatic LEDs for scanning systems or line-scanning systems with high requirements in terms of the amount of light, an efficient focusing of the emitted radiation is therefore necessary. It is shown in FIG. 1 that the radiation, indicated by arrow 14, ensues in the half-space according to type of a spherical light dispersal curve 16.

Figure 2:
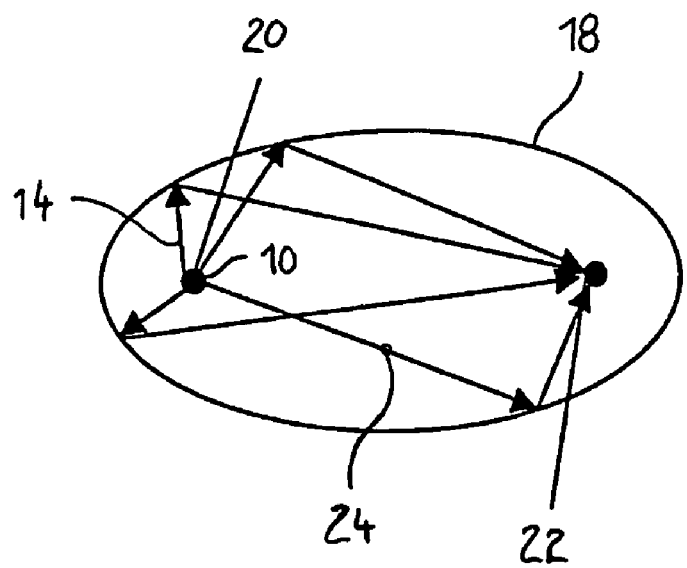
FIG. 2 is a schematic illustration of the principle of the radiation reflection on an elliptical mirror.

FIG. 2 shows the principle used in the invention. If a polychromatic LED 10 that emits light according to the light dispersal curve 16 is arranged in the focal point 20 in an elliptical mirror 18 with the two focal points 20 and 22, then this light is reflected on the elliptical mirror and focused in the second focal point 22. In principle, this is true for all beams. However, this is only utilized for beams that are emitted in the half-space in the direction of the light dispersal curve 16; theoretically, the beam 24 is also focused in the focal point 22. In general, it is sufficient to use only a section of the ellipse 18 as a mirror in order to achieve a sufficient concentration of the radiation emitted in the half-space. By skillful selection of the ellipse parameters, a compact geometric arrangement with many degrees of design freedom can be achieved. Due to the geometric reflection on the elliptical surface of the mirror 18, no chromatic errors arise; rather, the beams of different wavelengths are focused in the focal point 22 without the color edges arising.

In order to achieve a linear illumination, a section of an inner generated surface of an elliptical cylinder is used as a mirror. The focal points 20 and 22 are then points on focal lines 20 and 22. If a plurality of LEDs 10 are arranged in the focal line 20, a light line arises in the focal line 22 that is particularly well-suited for the optoelectronic scanning of masters.

Figure 3:
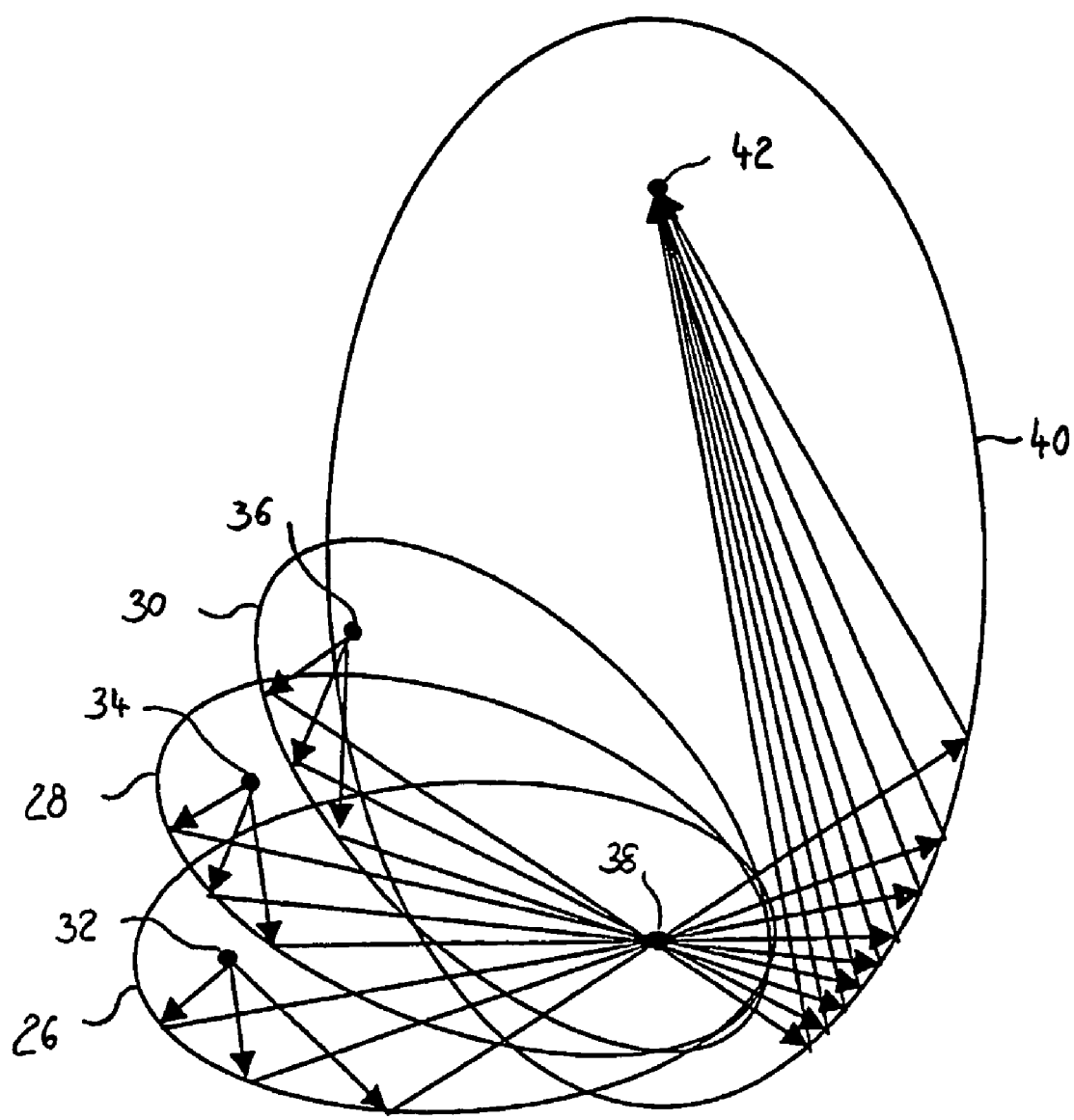
FIG. 3 is a schematic illustration of an arrangement with a plurality of elliptical mirrors and common focal points or, respectively, focal lines.

FIG. 3 now shows a expansion of the principle shown in FIG. 2 via parallel focusing with the aid of a plurality of elliptical mirrors 26, 28 and 30, whereby again mirror sections are sufficient for reflection of the radiation. In the respective first focal points or, respectively, focal lines 32, 34 and 36, one or, respectively, more LEDs according to type of the LED 10 are arranged. The various mirrors 26, 28 and 30 have a common second focal point 38 or, respectively, a common focal line 38. This focal point 38 or, respectively, focal line 38 is again a first focal point 38 or focal line 38 of a further elliptical concentrating mirror 40 with a second focal point 42 or, respectively, focal line 42 when the concentrating mirror 40 is fashioned as an elliptical cylinder mirror.

On the assumption that the mirrors 26, 28, 30 and 40 have elliptical cylinder mirror sections, the radiation starting from the first focal lines 32, 34 and 36 is focused in the second focal line 38 common to all mirrors. The radiation starting from this focal line 38, that coincides with the first focal line 38 of the mirror 40, is focused in the second focal line 42 of the mirror 40. Due to the series connection of the different mirrors, it is also possible to increase the light density still further in the focal line 42. The cascading with further mirrors can be continued, in that the focal line 42 is the first focal line of a further concentrating mirror (not shown). The radiation is then imaged in this second focal line.

In the case that not a light line, but rather a light spot, should be generated, a rotation element is to be used as a mirror, for example a section of an ellipsoid. Such a mirror then has no focal lines, but rather focal points. The radiation originating from the focal points 32, 34 and 36 is then focused on the ellipsoid mirror surfaces of the mirrors 26, 28 and 30 in the focal point 38 that coincides with the first focal point of the ellipsoid concentrating mirror 40. The radiation starting from the focal point 38 is then focused in the focal point 42, where a light spot of higher radiation density arises.

Figure 4:
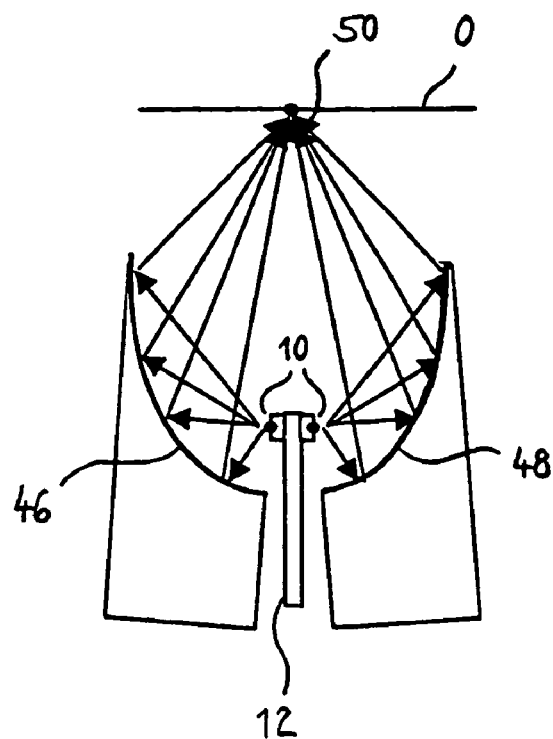
FIG. 4 is a side view of an embodiment with LED lines arranged double-side on a circuit board.

FIG. 4 shows an arrangement of a device for the linear illumination of an object O, whereby identical parts are subsequently identically designated. 12 LEDs 10 are arranged on a circuit board 12 in a row on both sides of the circuit board 12. These LEDs 10 are arranged along the first focal line of two elliptical cylinder mirrors 46 and 48. These mirrors 46 and 48 focus the radiation in their (respectively) second focal line 50 that topically coincides and illuminates the object O. The shown device has a compact assembly, since the emission characteristic of the LED that only emits radiation in a half-space is linked with the beneficial imaging characteristics of the elliptical mirror 46 and 48. In this manner, it is possible to detect the total emitted radiation with the aid of a relatively small mirror element. By selecting the ellipse parameter, a largely more compact assembly can be achieved, such that radiation can be also focused on the object O over a relatively large distance.

Figure 5:
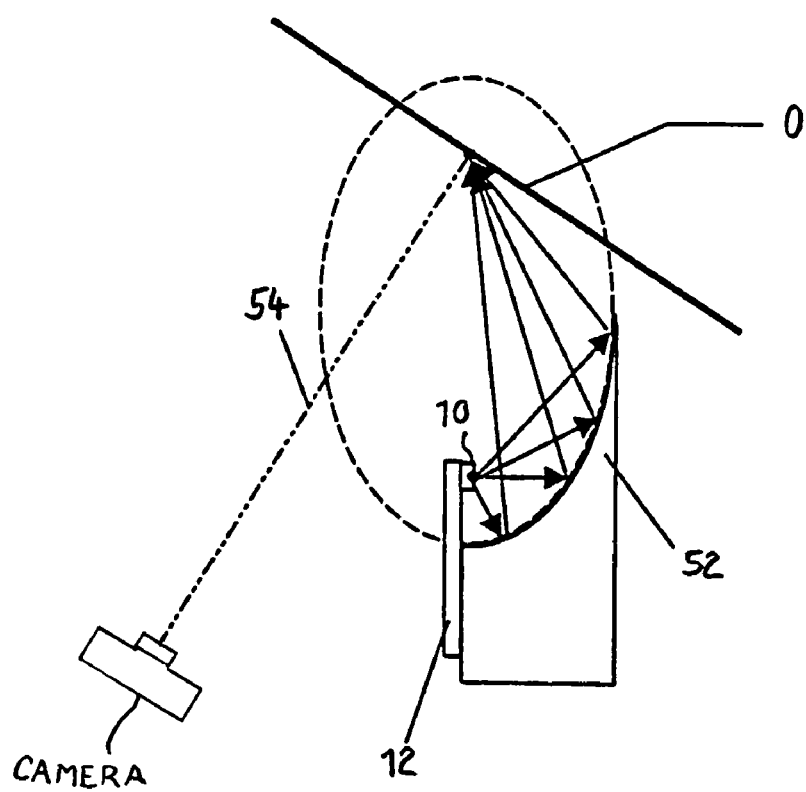
FIG. 5 is a schematic side illustration of an illumination device with an LED row.

FIG. 5 shows an assembly with only one row of LEDs 10 on the circuit board 12. The elliptical mirror 52 is directly connected to the circuit board 12, whereby a simpler design assembly arises. The object O to be illuminated is tilted relative to the vertical in which the circuit board 12 lies. The object O linearly illuminated is scanned with the aid of a camera (not shown) from the direction 54.

Figure 6:
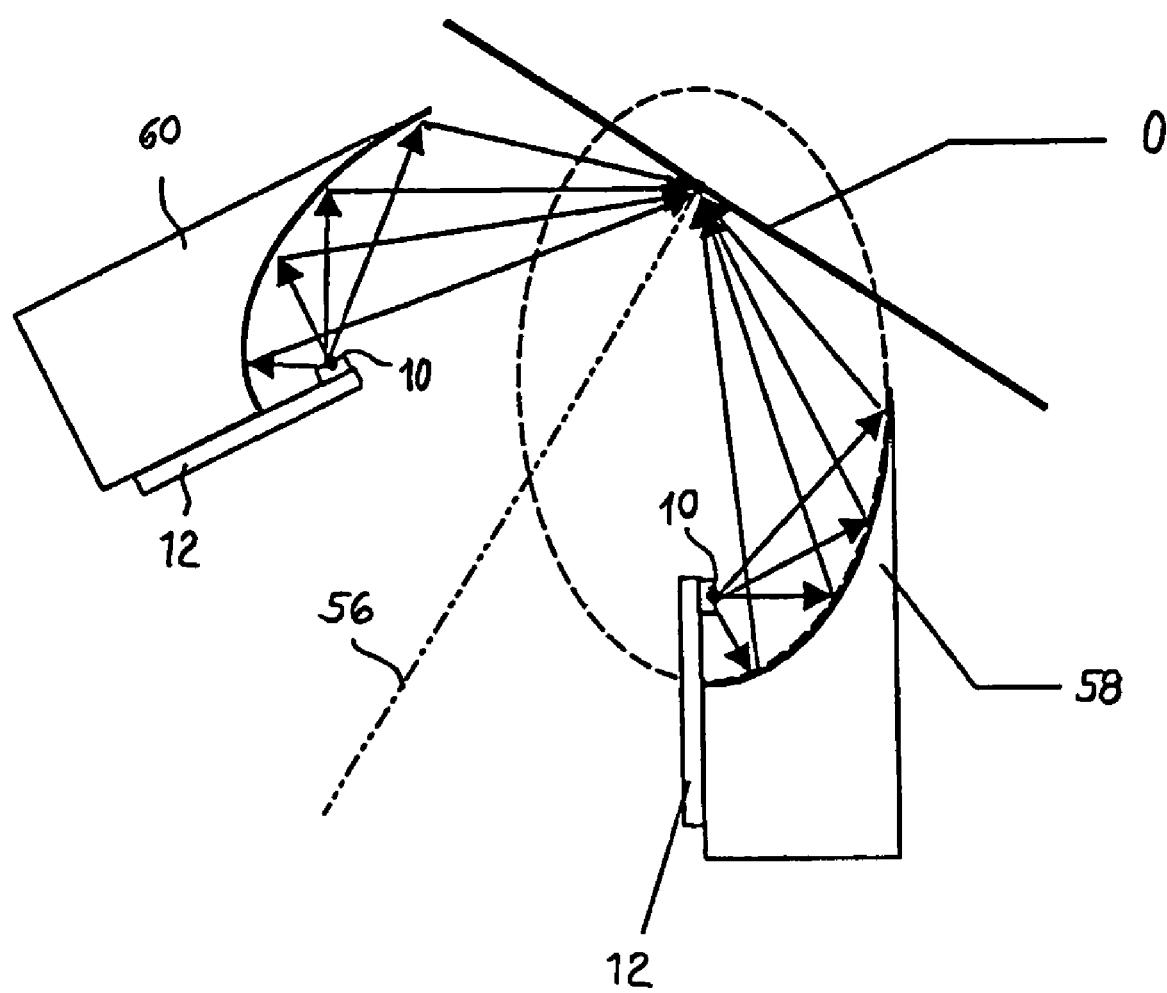
FIG. 6 is a schematic illustration of a symmetric arrangement of two LED lines and two elliptical mirrors.

FIG. 6 shows an assembly symmetric to an axis of symmetry 56 that is perpendicular to the object O, for example a printing master. The axis of symmetry 56 also simultaneously forms the middle axis of the angular field for a scanning camera. The elliptical mirrors 58 and 60 respectively form a unit with the circuit boards 12. The light line originating on the object O can freely be accessed from the direction 56. A cast shadow can be largely avoided in the shown arrangement.

Figure 7:
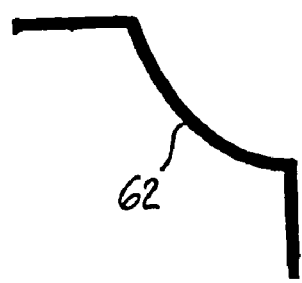
FIG. 7 is a cross-section of a mirror in the form of an elliptical cylinder generated surface.

FIG. 7 shows the assembly of the elliptical mirror cylinder 62 in cross section. It is produced by forming a sheet, for example with the thickness 0.5 mm.

Figure 8:
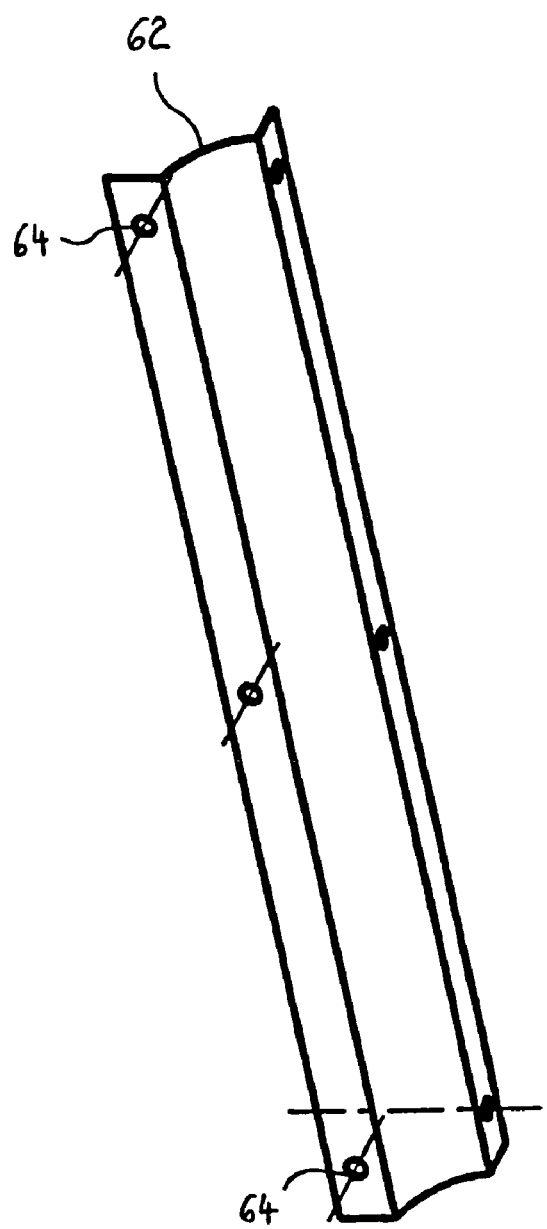
FIG. 8 is a perspective representation of a fashioned sheet serving as an elliptical cylinder mirror.

FIG. 8 shows a perspective representation of the elliptical mirror cylinder 62, on whose edges attachment holes 64 are provided.

The shown devices can be used to particular advantage for image scanning systems, digital scanners, and copier systems.

Although other modifications and changes may be suggested by those skilled in the art, it is the intention of the inventors to embody within the patent warranted hereon all changes and modifications as reasonably and properly come within the scope of their contribution to the art.

The invention claimed is:

1. A device to for linear illumination of an object, comprising:
   a plurality of mirrors each having a first focal line and a second focal line and having a form of an inner generated surface of an elliptical cylinder, said second focal lines of said plurality of mirrors being common to one another to form a common focal line; and
   a plurality of LEDs arranged along said first focal line of each of said plurality of mirrors and oriented to emit radiation in a direction toward respective ones of said mirrors so that emitted radiation is concentrated in common focal line.

2. A device according to claim 1, further comprising:
   a concentrating mirror with first and second focal lines, said first focal line of said concentrating mirror coinciding with said common focal line; and
   radiation coming from said first focal line being concentrated in said second focal line of said concentrating mirror.

3. A device according to claim 2, wherein said plurality of mirrors includes a cascade of mirrors each with first and second focal lines; and
   said concentrating mirror being positioned in front of said cascade of mirrors shaped to concentrate in its second focal line radiation originating from its first focal line, said first focal line of said concentrating mirror being positioned coinciding with said second focal lines of said cascade of mirrors to concentrate radiation of said cascade of mirrors in said second focal line of said concentrating mirror.

4. A device according to claim 1, wherein said LEDs are polychromatic light emitting LEDs.

5. A device according to claim 4, wherein said LEDs emit visible light.

6. A device according to claim 1, wherein the object to be illuminated is arranged along said second focal line of said plurality of mirrors.

7. A device as claimed in claim 3, wherein the object to be illuminated is arranged along said second focal line of said concentrating mirror.

8. A device according to claim 1, further comprising:
   a circuit board on which said LEDs are arranged in a row, and
   said at least one of said mirrors is arranged near said circuit board or connected to said circuit board.

9. A device according to claim 1, further comprising:
   a circuit board on both sides of which is a row of LEDs per side; and
   one of said plurality of mirrors on each side of said circuit board arranged so that said second focal lines meet in a concentrating focal line.

10. A device according to claim 1, further comprising:
    two circuit boards with LEDs and one of said mirrors per each circuit board arranged symmetric to an axis of symmetry;
    said second focal lines of said mirrors meeting in a concentrating focal line on an axis of symmetry; and
    the object to be illuminated arranged in said concentrating focal line.

11. A device according to claim 1, further comprising:
    a camera arranged to scan the illuminated object.

12. A method for linear illumination of an object, comprising the steps of:
    providing a plurality of mirrors each having a first focal line and a second focal line and having a cylindrical section of each mirror in a form of an inner generated surface of an elliptical cylinder;
    emitting radiation in a direction of each said mirror by a plurality of LEDs arranged along said first focal line; and
    reflecting the radiation from said plurality of mirrors so that said radiation is concentrated in a common second focal line.

13. A method according to claim 12, further comprising:
    providing a concentrating mirror with first and second focal lines positioned so that said first focal line of said concentrating mirror coincides with said common focal line; and
    concentrating radiation coming from said first focal line in said second focal line of said concentrating mirror.

14. A method according to claim 12, further comprising:
    cascading said plurality of mirrors in front of a concentrating mirror which concentrates in its second focal line radiation originating from its first focal line;
    positioning said second focal line of said plurality of mirrors to coincide with said first focal line of said concentrating mirror; and
    concentrating the radiation in said second focal line of said concentrating mirror.

15. A method according to claim 12, further comprising: generating polychromatic light with said LEDs.

16. A method according to claim 15, wherein said polychromatic light is visible light.

17. A method according to claim 12, further comprising: arranging the object to be illuminated along said second focal line of said plurality of mirrors.

18. A method according to claim 14, further comprising: arranging the object to be illuminated along said second focal line of said concentrating mirror.

19. A method according to claim 12, further comprising: scanning the object with a camera.

20. A system for linear illumination of an object, comprising:
a sensor positioned to detect radiation radiated from the object;
a plurality of mirrors each having a cylindrical section in a form of an inner generated surface of an elliptical cylinder and each having a respective first focal point and a second focal point;
a plurality of LEDs arranged along said first focal point for each said mirror, said LEDs emitting radiation in a direction of respective ones of said mirrors; and
said plurality of mirrors being positioned to concentrate the radiation reflected from said plurality of mirrors in a common second focal point.

21. A device for the illumination of an object by a light spot, comprising:
a plurality of mirrors each having a section of the mirror in a form of an inner generated surface of an ellipsoid and having a respective a first focal point and a second focal point;
for each mirror, at least one LED arranged at said first focal point that emits radiation in a direction of the respective mirror; and
the radiation reflected from said plurality of mirrors being concentrated in a common second focal point.

22. A device according to claim 21, further comprising:
a concentrating mirror with first and second focal points, said first focal point of said concentrating mirror coinciding with said common focal point, the radiation coming from said first focal point of said concentrating mirror being concentrated in said second focal point of said concentrating mirror.

23. A device according to claim 22, wherein said plurality of mirrors are positioned in a cascade with said mirrors having a common second focal point; and further comprising:
a concentrating mirror positioned in front of said cascade with a first focal point of said concentrating mirror coinciding with said common second focal point, said concentrating mirror concentrating at its second focal point radiation originating from its first focal point.

24. A device according to claim 20, wherein said LEDs generate polychromatic light.

25. A device according to claim 24, wherein said LEDs emit visible light.

26. A device according to claim 21, wherein the object to be illuminated is arranged at said common second focal point of said plurality of mirrors.

27. A device as claimed in claim 23, wherein the object to be illuminated is positioned at said second focal point of said concentrating mirror.

28. A device according to claim 21, further comprising:
a circuit board on which said LED is arranged, said mirror being is arranged near said circuit board or connected to it.

29. A device according to claim 21, further comprising:
a circuit board equipped on both sides with said LEDs per side, said mirrors being arranged on each side of said circuit board so that second focal points of said mirrors concentrate emissions from said LEDs to a focal point.

30. A device according to claim 29, further comprising:
two circuit boards with said LEDs and one of said mirrors per each, said two circuit boards being arranged symmetric to an axis of symmetry, the second focal points of the mirrors meeting in a concentrating focal point on said axis of symmetry, and
the object to be illuminated being arranged in said concentrating focal point.

31. A device according to claim 21, further comprising:
a camera positioned to scan the object.

* * * * *